(12) United States Patent
Rubens et al.

(10) Patent No.: US 11,453,108 B2
(45) Date of Patent: Sep. 27, 2022

(54) HAND HELD ROTARY TOOL WITH ADAPTER FOR QUICK CONNECTION TO ACCESSORIES

(71) Applicant: Robert Bosch GmbH, Stuttgart (DE)

(72) Inventors: Jeremy Rubens, Palatine, IL (US); Christopher Crowell, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 290 days.

(21) Appl. No.: 16/707,386

(22) Filed: Dec. 9, 2019

(65) Prior Publication Data
US 2021/0169211 A1 Jun. 10, 2021

(51) Int. Cl.
| | | |
|---|---|---|
| *B25F 3/00* | (2006.01) | |
| *B23B 31/00* | (2006.01) | |
| *A46B 13/02* | (2006.01) | |

(52) U.S. Cl.
CPC .............. *B25F 3/00* (2013.01); *B23B 31/008* (2013.01); *A46B 13/02* (2013.01); *B23B 2231/04* (2013.01)

(58) Field of Classification Search
CPC ..... B25F 3/00; B23B 31/008; B23B 2231/04; A46B 13/02
See application file for complete search history.

(56) References Cited

U.S. PATENT DOCUMENTS

| | | | | | |
|---|---|---|---|---|---|
| 4,949,463 | A | * | 8/1990 | Chen | B23D 57/0076 30/500 |
| 5,398,454 | A | * | 3/1995 | Berner | B24B 23/04 451/357 |
| 5,533,926 | A | * | 7/1996 | Nemazi | B24B 45/006 451/344 |
| 5,609,515 | A | * | 3/1997 | Takach | B25F 5/00 451/166 |
| 6,463,824 | B1 | * | 10/2002 | Prell | B25F 3/00 173/29 |
| 6,679,658 | B2 | | 1/2004 | Landt | |

(Continued)

FOREIGN PATENT DOCUMENTS

| | | |
|---|---|---|
| DE | 4207138 | 7/1993 |
| EP | 1129825 | 5/2001 |
| EP | 1454710 | 8/2004 |

OTHER PUBLICATIONS

GB Search Report for GB2019214.2.

*Primary Examiner* — Eric A. Gates
(74) *Attorney, Agent, or Firm* — Kelly McGlashen (57) ABSTRACT

A hand-held rotary tool includes a housing that encloses a motor having an output shaft. The tool includes a quick connect adaptor configured to connect an accessory to the output shaft. The adaptor includes a driver that is connected to the output shaft and rotates in concert with the output shaft. An outer surface of the driver has a first flat. The adaptor includes a receiver that includes a connector configured to detachably connect with the housing, and a torque transfer device configured to receive the driver. An inner surface of the torque transfer device includes a second flat that engages with the first flat in such a way that rotation of the driver results in rotation the torque transfer device relative to the connector. The adaptor includes an output device that supports the accessory and that is driven by the torque transfer device to move relative to the connector.

18 Claims, 7 Drawing Sheets

(56) References Cited

U.S. PATENT DOCUMENTS

| | | |
|---|---|---|
| 6,821,048 B2 | 11/2004 | Talesky |
| 7,077,736 B2 * | 7/2006 | Uzumcu ............... B23D 47/126 |
| | | 451/358 |
| 7,331,738 B2 | 2/2008 | Hofbrucker et al. |
| 9,162,353 B2 * | 10/2015 | Ciotti ..................... B25B 27/10 |
| 2003/0044252 A1 | 3/2003 | Landt |
| 2009/0032138 A1 | 2/2009 | Alleman et al. |
| 2013/0284472 A1 | 10/2013 | Kildevaeld |
| 2019/0039200 A1 * | 2/2019 | Liaw ....................... B25D 9/08 |

* cited by examiner

HAND HELD ROTARY TOOL WITH ADAPTER FOR QUICK CONNECTION TO ACCESSORIES

BACKGROUND

In general, hand-held rotary power tools are light-weight power tools capable of being equipped with a variety of accessory tools and attachments, such as cutting blades, sanding discs, grinding tools, and many others. A hand-held rotary cleaning tool is a rotary power tool that facilitates cleaning and includes accessories such as brushes, scrubbing pads and polishing pads. Some handheld rotary power tools may include a housing that serves as a handle for the tool and as an enclosure for an electric motor and a battery that supplies power to the electric motor. The electric motor drives an output shaft to rotate at high speeds. The output shaft is equipped with an accessory attachment mechanism that enables a cleaning accessory to be releasably secured to the tool. For example, in some hand-held rotary power tools, the accessory attachment mechanism may be external threads provided on the output shaft. However, installing accessories on such power tools, which requires a lot of threading, can be tedious and time consuming. It is desirable to have a hand-held rotary power tool that allows a user to quickly attach and remove accessories to and from the output shaft.

SUMMARY

In some aspects, a rotary power tool assembly includes a hand-held rotary power tool and an adaptor that is connected to the tool. The adaptor is configured to connect accessories to the tool. The tool includes a housing having a collar disposed at one end of the housing. The collar is fixed relative to the housing. In addition, the tool includes a motor disposed inside the housing. The motor has an output shaft that extends through an opening in the collar so as to protrude from the housing. The output shaft is rotatable relative to the collar. The adaptor includes a driver that is connected to the output shaft in such a way as to rotate in concert with the output shaft. An outer surface of the driver has a first geometric feature. The adaptor also includes a receiver having a connector, a torque transfer device and an output device. The connector is configured to engage with the collar in such a way that the receiver is detachably connected to the housing. The torque transfer device is configured to receive the driver. An inner surface of the torque transfer device includes a second geometric feature that is configured to engage with the first geometric feature in such a way that rotation of the driver results in rotation the torque transfer device relative to the connector. The output device is supported by the connector and is driven by the torque transfer device to move relative to the connector.

In some embodiments, an outer surface of the output shaft includes a first helical thread, and the driver includes an inner surface. The driver inner surface includes a second helical thread that is shaped and dimensioned to engage with the first helical thread in such a way that the output shaft and the driver are connected.

In some embodiments, the first geometric feature includes a flat provided on the driver outer surface and the second geometric feature includes a corresponding flat provided on the torque transfer device inner surface.

In some embodiments, the first geometric feature and the second geometric feature each comprise a plurality of flats arranged in a hexagonal configuration, and each flat of the first geometric feature confronts a corresponding flat of the second geometric feature.

In some embodiments, the connector includes a through opening that is concentric with an axis of rotation of the output shaft. In addition, the torque transfer device includes a cup portion including a base and a sidewall that protrudes from a first side of the base toward the housing. An inner surface of the sidewall includes the second geometric feature. The torque transfer device includes a drive shaft that protrudes from a second side of the base. The second side of the base is opposed to the first side of the base. The drive shaft is connected to the output device in such a way that rotation of the torque transfer device results in movement of the output device.

In some embodiments, the torque transfer device is disposed in the through opening of the connector, and is supported relative to the connector by the output device.

In some embodiments, the drive shaft is a pin, and the output device comprises an arm that is supported by the connector for translation relative to the connector. The arm includes a slot that receives the pin, whereby rotation of the drive shaft results in translation of the arm relative to the connector.

In some embodiments, the pin extends in parallel to the axis of rotation, and the slot is elongated in a direction perpendicular to the axis of rotation. In addition, the arm is supported by the connector in such a way that the arm can translate relative to the connector in a direction that is perpendicular to both the axis of rotation and the direction of elongation of the slot, and the pin is engaged with the slot in such a way that rotation of the drive shaft results in oscillation of the arm.

In some embodiments, the rotary power tool assembly includes the accessory connected to the arm. The accessory may be a brush.

In some embodiments, the drive shaft is a pinion gear, and the connector includes an internal ring gear disposed on an inner surface thereof. In addition, the output device includes planetary gears engaged with both the drive shaft and the internal ring gear, the planetary gears driven for rotation by the drive shaft, and a carrier that supports the planetary gears and provides an axle for each of the planetary gears. By this configuration, rotation of the drive shaft results in rotation of each planetary gear about the corresponding axle and rotation of the carrier relative to the connector.

In some embodiments, the torque transfer device is disposed in the through opening of the connector, and is supported relative to the connector by the output device.

In some embodiments, the rotary power tool assembly includes the accessory connected to the carrier. The accessory may be a brush.

In some embodiments, the collar is configured to fixedly engage with the connector via a quick-disconnect connection device.

In some embodiments, the connector includes a first quarter turn connecting structure, the collar includes a second quarter turn connecting structure, and the collar is configured to fixedly engage with the connector via engagement of the first quarter turn connecting structure with the second quarter turn connecting structure.

In some aspects, an adaptor is configured to connect an accessory to a motorized hand tool having a rotatable output shaft. The adaptor includes a driver that is connected to the output shaft in such a way as to rotate in concert with the output shaft. An outer surface of the driver has a first geometric feature. The adaptor includes a receiver, the receiver including a connector, a torque transfer device and an output device. The connector is configured to engage with the collar in such a way that the receiver is detachably connected to the housing. The torque transfer device is configured to receive the driver. An inner surface of the torque transfer device includes a second geometric feature that is configured to engage with the first geometric feature in such a way that rotation of the driver results in rotation the torque transfer device relative to the connector. In addition the output device is supported by the connector and is driven by the torque transfer device to move relative to the connector.

In some embodiments, the connector comprises a through opening that is concentric with an axis of rotation of the output shaft. The torque transfer device includes a cup portion including a base and a sidewall that protrudes from a first side of the base toward the housing. An inner surface of the sidewall includes the second geometric feature. The torque transfer device includes a drive shaft that protrudes from a second side of the base. The second side of the base is opposed to the first side of the base. The drive shaft is connected to the output device in such a way that rotation of the torque transfer device results in movement of the output device.

In some embodiments, the drive shaft is a pin, and the output device comprises an arm that is supported by the connector for translation relative to the connector. The arm includes a slot that receives the pin, whereby rotation of the drive shaft results in translation of the arm relative to the connector.

In some embodiments, the drive shaft is a pinion gear and the connector includes an internal ring gear disposed on an inner surface thereof. In addition, the output device includes planetary gears engaged with both the drive shaft and the internal ring gear, the planetary gears driven for rotation by the drive shaft, and a carrier that supports the planetary gears and provides an axle for each of the planetary gears. Rotation of the drive shaft results in rotation of each planetary gear about the corresponding axle and rotation of the carrier relative to the connector.

In some aspects, a hand-held rotary power tool is a light-weight power tool having a rotating output shaft that protrudes through a collar provided on the tool housing and is capable of being attached to a variety of accessories. The rotary power tool includes an adaptor that allows a user to quickly and easily attach accessories to, or detach accessories from, the output shaft. The adaptor includes a driver that is connected to the output shaft in such a way as to rotate in concert with the output shaft, and a receiver that is configured to form a quick connection with the tool housing and transmit the rotary motion of the output shaft into an accessory that is attached to the receiver. In some embodiments, the receiver transforms the rotary motion of the output shaft to a reciprocating motion of the accessory. In other embodiments, the receiver transmits the rotary motion of the output shaft to a rotary motion of the accessory at a reduced speed and increased torque relative to that of the output shaft. The receiver includes a connector, a torque transfer device and an output device. The connector is configured to engage with the tool housing in such a way that the receiver is detachably connected to the tool housing. The torque transfer device is configured to receive the driver. An outer surface of the driver and an inner surface of the torque transfer device include complimentary geometric features that permit the torque transfer device to engage with the driver in such a way that rotation of the driver results in rotation the torque transfer device relative to the connector. The receiver includes an output device that is supported by the connector and that is driven by the torque transfer device to move relative to the connector. The output device provides a connection to the accessory.

The connector allows for quick connection to and detachment from the tool housing while preventing relative movement between the connector and the tool housing and allowing transfer of torque to the accessory.

DETAILED DESCRIPTION

Figure 1:
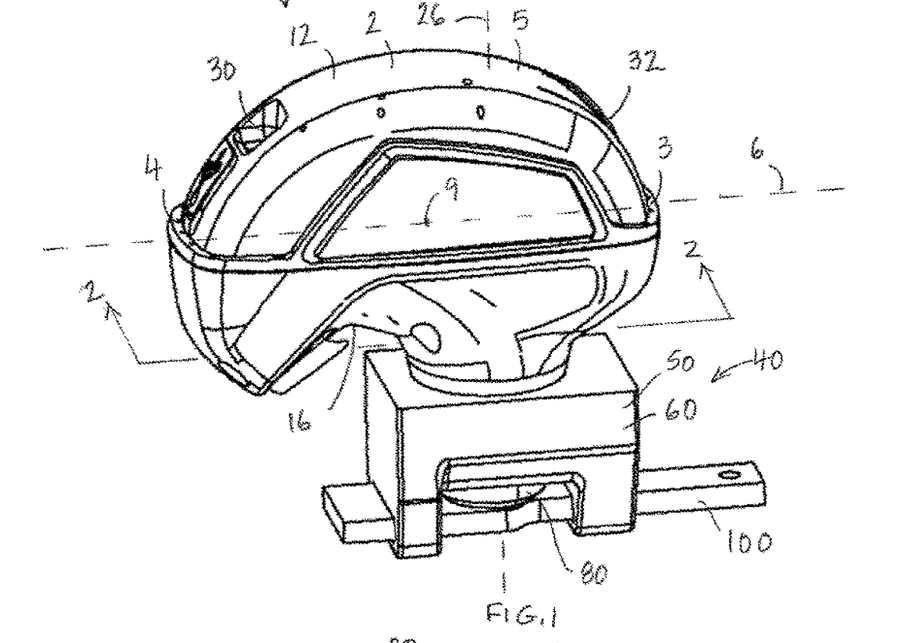
FIG. 1 is a rear perspective view of a handheld rotary power tool including an adaptor that permits an accessory to be attached to the output shaft of the tool.
Figure 2:
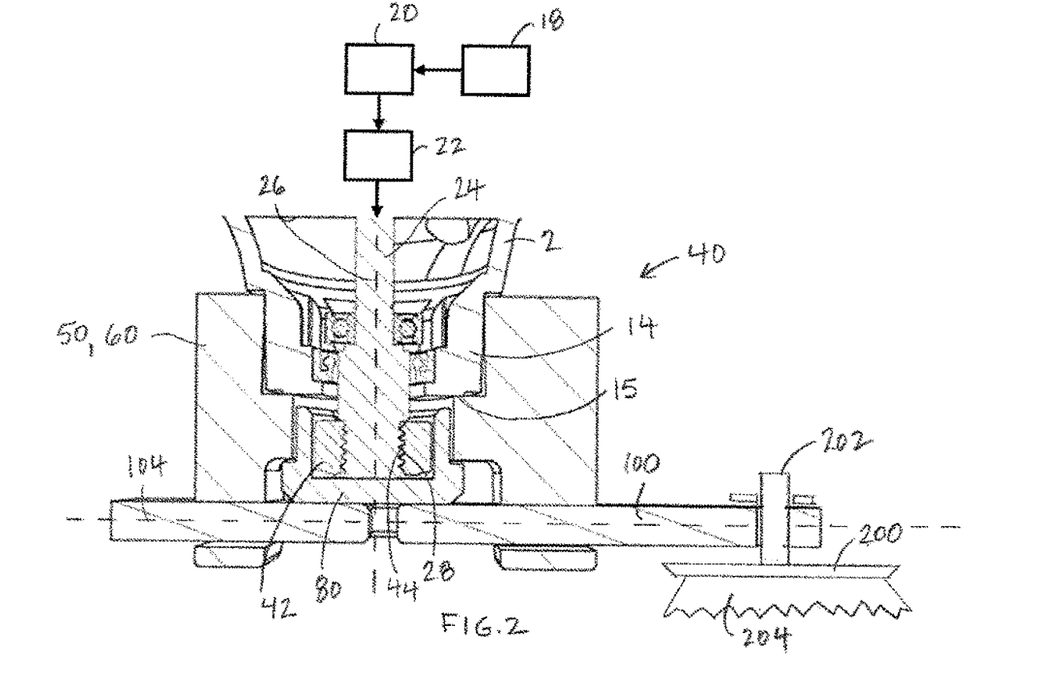
FIG. 2 is a cross-sectional view of a portion of the handheld rotary power tool of FIG. 1 as seen along line 2-2 of FIG. 1.

Referring now to FIGS. 1 and 2, a rotary cleaning tool 1 is a hand-held rotary power tool that facilitates cleaning. The rotary cleaning tool 1 includes a housing 2 that encloses an electric motor 20 and a gear set 22 that connects the motor 20 to an output shaft 24 of the tool 1. The rotary cleaning tool 1 includes at least one cleaning accessory 200 that is detachably connected to the output shaft 24 via an adaptor 40, as discussed below. The adaptor 40 allows accessories to be quickly and easily attached to, and detached from, the output shaft 24, as discussed in detail below.

The housing 2 serves as a handle 5 of the tool 1, and is shaped and dimensioned to permit the tool 1 to be hand held. As used herein, the term "hand held" refers to a housing having a shape that permits holding by a human hand, and a size and weight that permits the tool 1 to be easily lifted, manipulated and operated by the human hand. In the illustrated embodiment, the housing 2 generally has an ellipsoid shape. The housing 2 is elongated along a major axis 6, and includes a convex portion 12 that faces a palm of a user when the tool 1 is in use. The housing 2 includes a collar 14. The collar 14 is fixed to the housing 2 and protrudes in a direction away from the convex portion 12. More particularly, the collar 14 surrounds the output shaft 24, protrudes in a direction that is perpendicular to the major axis 6, and is disposed between a midpoint 9 of the major axis 6 and a first end 3 of the housing 2 (e.g., a "front end" of the housing 2). The housing 2 also includes a concavity 16 that is disposed between the midpoint 9 of the major axis 6 and a second end 4 of the housing 2 (e.g., a "rear end" of the housing 2), where the housing second end 4 is opposed to the housing first end 3. The concavity 16 provides a grip that may be grasped by the fingers of a user when the tool 1 is in use.

The housing 2 may be constructed of a rigid material such as plastic, metal, or composite materials such as a fiber reinforced polymer. The housing 2 encloses the electric motor 20 and the gear set 22. The output shaft 24 is driven to rotate about a rotational axis 26 by the motor 20 via the gear set 22, and a portion of the output shaft 24 protrudes from the housing 2. In particular, the protruding portion of the output shaft 24 protrudes from a terminal end 15 of the collar 14. The gear set 22 is configured so that the output shaft 24 rotates at a reduced rotational speed relative to the output of the motor 20. The housing 2 also encloses a battery 18 that provides power to the motor 20. In some embodiments, the battery 18 may be recharged via an electrical connector 30 supported on the convex portion 12 adjacent to the housing second end 4. Power to the motor 20 is controlled by a power switch 32 provided on the convex portion 12 adjacent to the housing first end 3.

Figure 3:
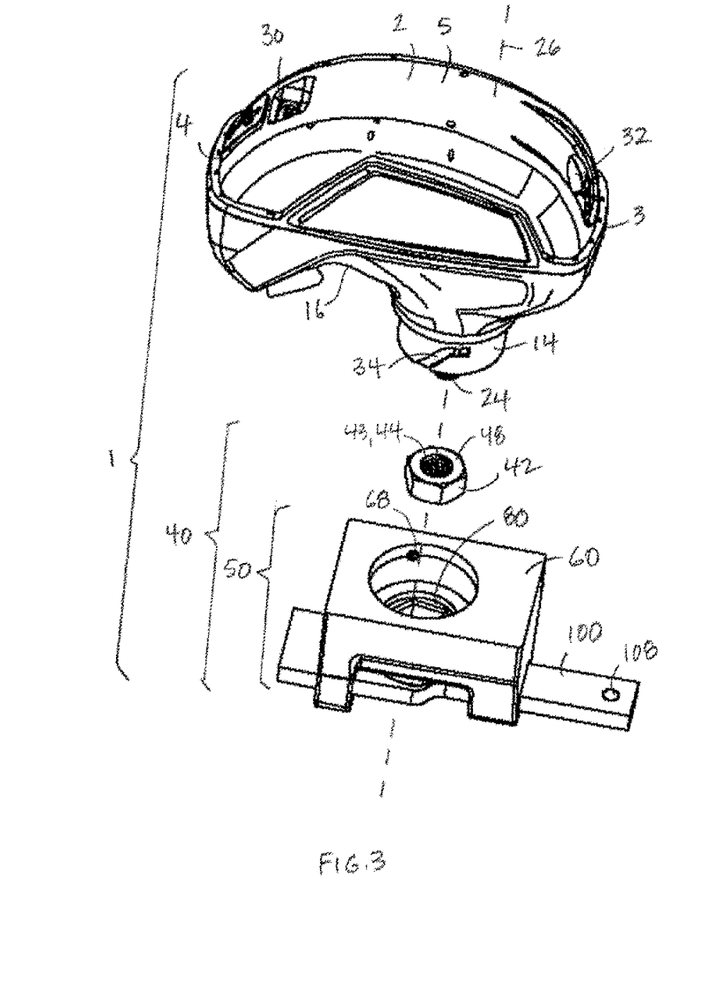
FIG. 3 is an exploded top perspective view of the handheld rotary power tool of FIG. 1.
Figure 4:
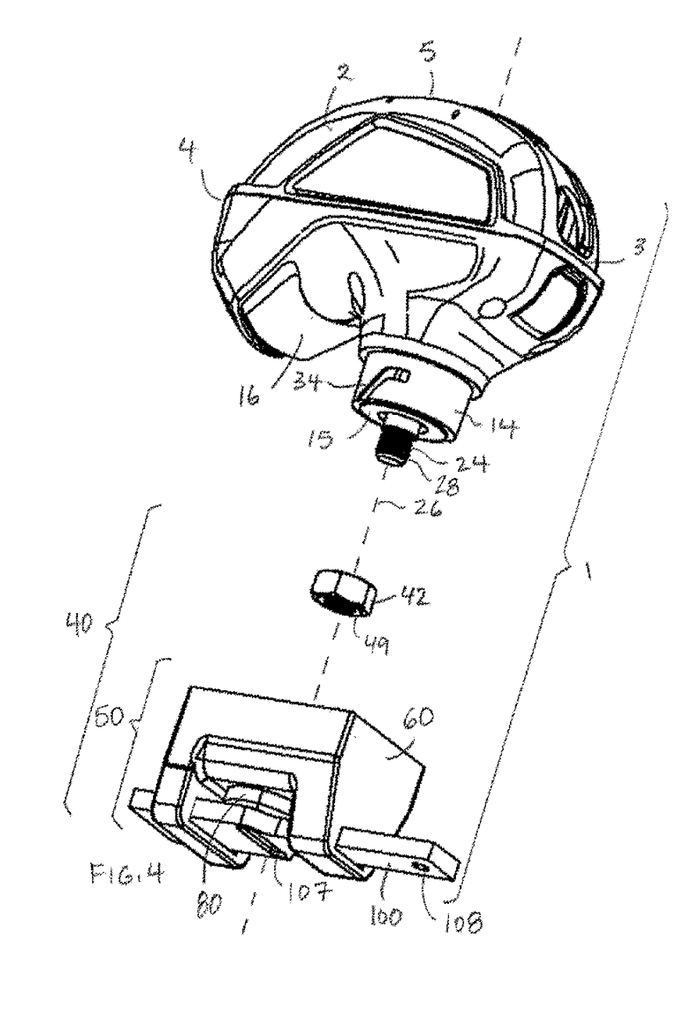
FIG. 4 is an exploded bottom perspective view of the handheld rotary power tool of FIG. 1.

Referring also to FIGS. 3 and 4, an outer surface of the collar 14 includes features that allow it to mechanically engage with corresponding features of a connector 60 of the adaptor 40 and retain the adaptor 40 on the housing 2. For example, in the illustrated embodiment, the outer surface of the collar 14 includes a retaining groove 34 disposed on each of opposed sides of the collar 14. The retaining grooves 34 open at the terminal end 15 of the collar 14, and generally extend along a tortuous path toward the handle 5 and along a circumference of the collar 14. The retaining grooves 34 each receive and retain a corresponding protrusion 68 that protrudes from an inner surface of the adaptor 40, as discussed further below.

The rotational axis 26 of the output shaft 24 is perpendicular to the major axis 6. In addition, the rotational axis 26 intersects the major axis 6 at a location between the center of the major axis 6 and the housing first end 3. The output shaft 24 protrudes from the terminal end 15 of the collar 14. The portion of the output shaft 24 that protrudes from the collar 14 includes features that allow it to mechanically engage corresponding features of a driver 42 of the adaptor 40. For example, in the illustrated embodiment, the output shaft 24 has an external thread 28 that engages, and forms a mechanical connection with, a corresponding internal thread 44 of the driver 42, as discussed further below.

Figure 5:
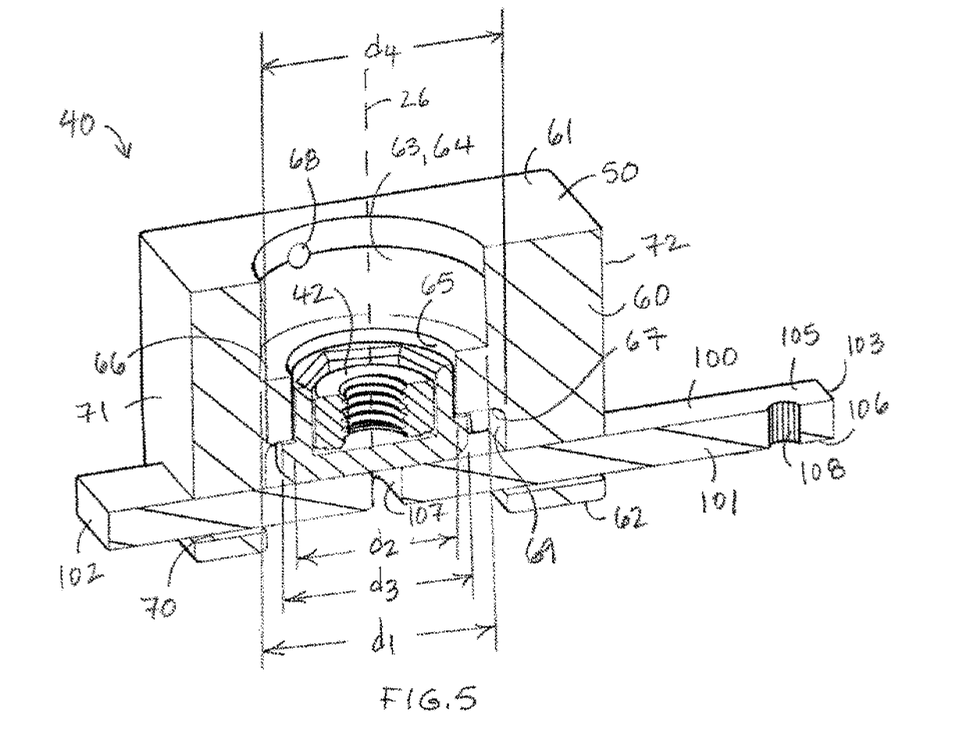
FIG. 5 is a cross-sectional view the adaptor of FIG. 1.
Figure 6:
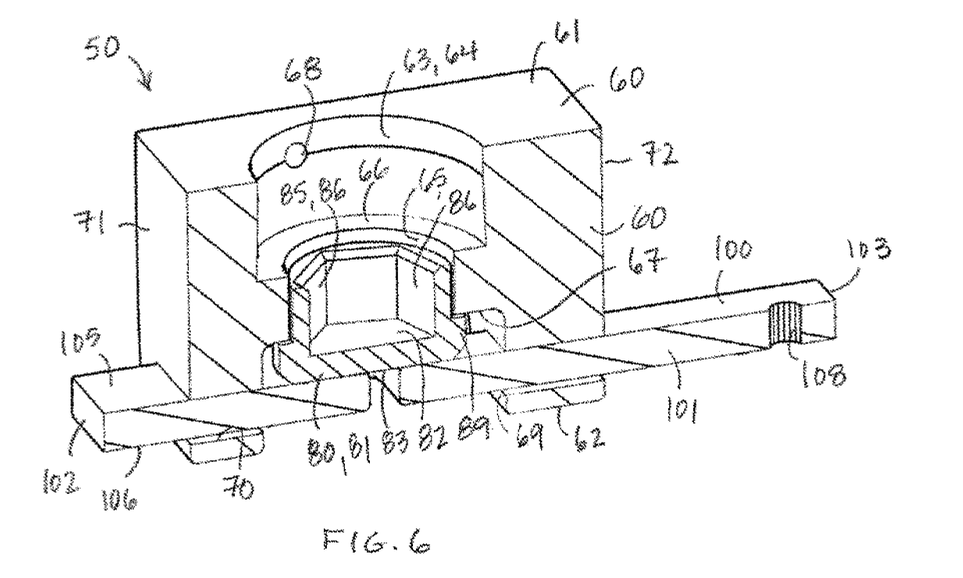
FIG. 6 is a cross-sectional view the adaptor of FIG. 1, with the driver omitted.
Figure 7:
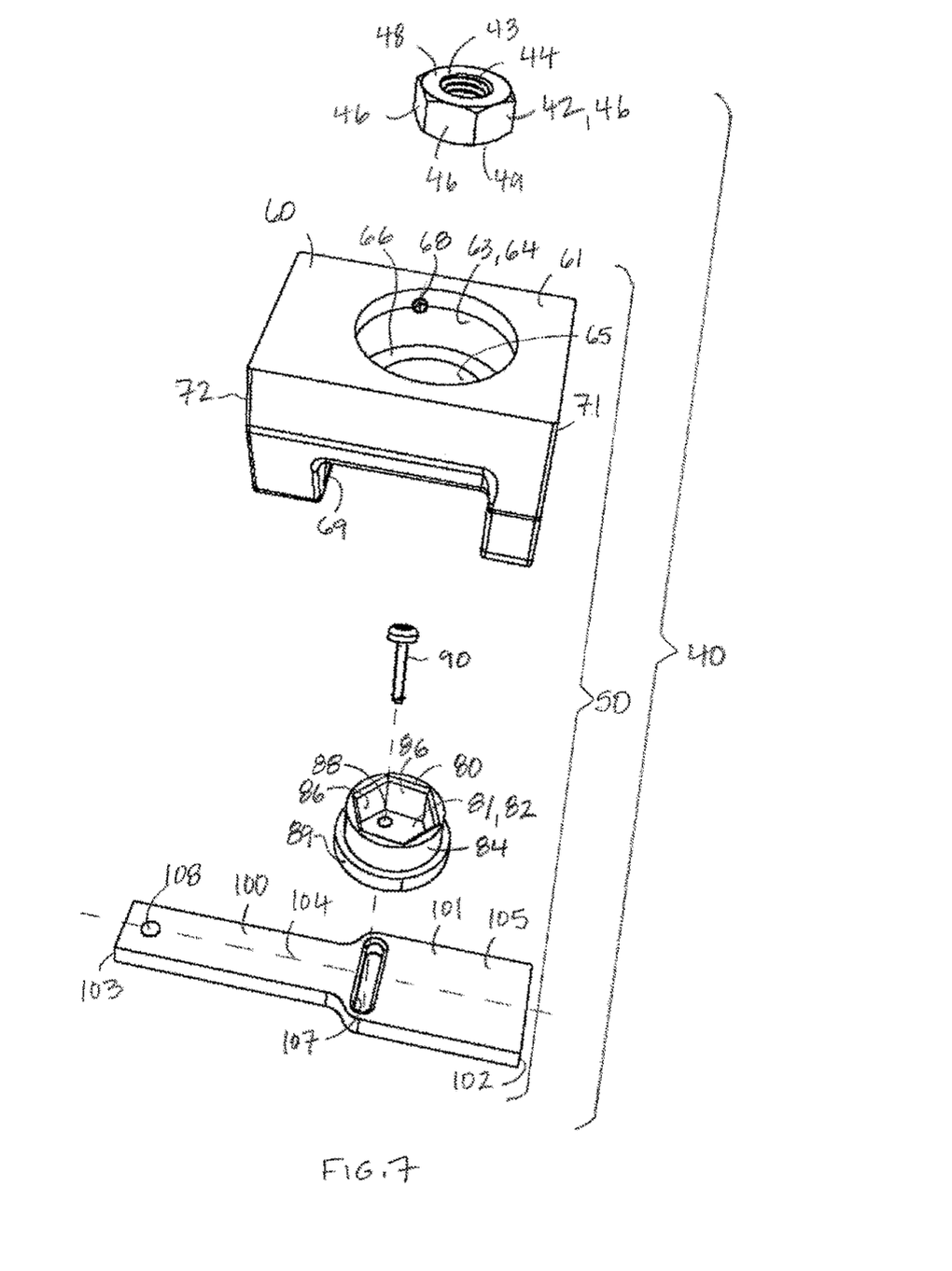
FIG. 7 is an exploded top perspective view of adaptor of FIG. 1.
Figure 8:
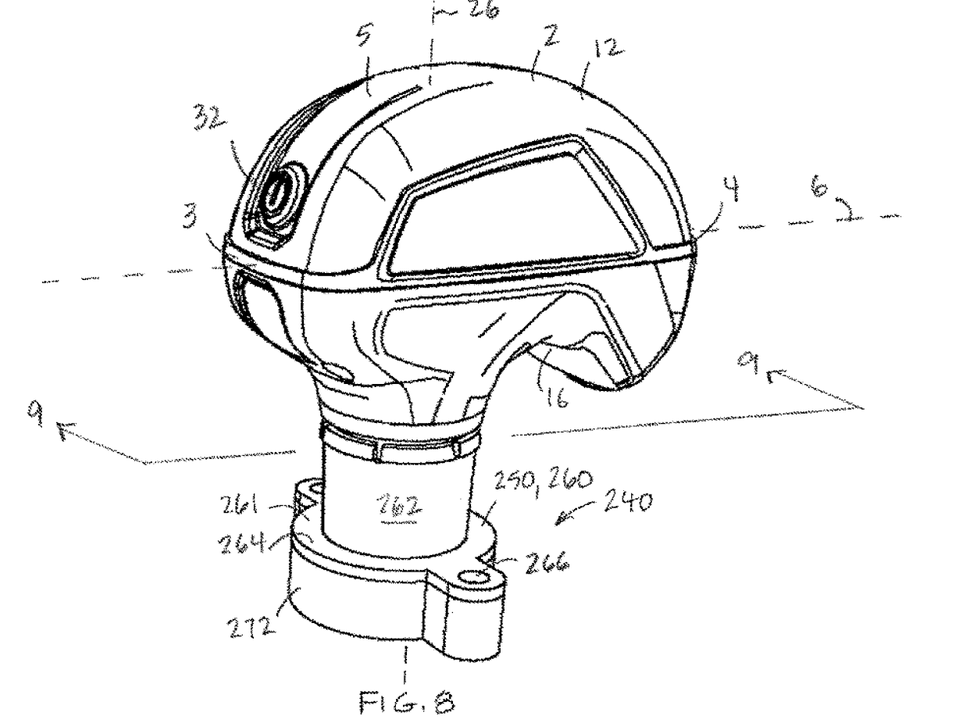
FIG. 8 is a perspective view of a handheld rotary power tool including an alternative embodiment adaptor.

Referring to FIGS. 5-7, the adaptor 40 includes a driver 42 that is connected to the output shaft 24, and a receiver 50 that receives the driver 42, and transmits the rotational movement of the output shaft 24 to the accessory 200. The receiver 50 is configured to transform the rotational movement into an oscillating movement and transmit the oscillating movement to the accessory 200, as will be described in detail below.

The driver 42 is connected to the output shaft 24 in such a way as to rotate in concert with the output shaft 24. For example, in the illustrated embodiment, the driver 42 includes an opening 43 having an internal thread 44. The internal threads 44 are configured to engage with the external thread 28 of the output shaft 24. The driver 42 includes an external geometry that allows the driver 42 to transfer torque from the output shaft 24 to the receiver 50. For example, in some embodiments, the driver 42 includes a geometric feature such as a flat 46, where the term "flat" as used herein refers to a planar region. In the illustrated embodiment, the driver 42 has six flats 46 that are distributed along a circumference of the driver 42, each flat 46 sharing a common edge with the adjoining flats 46 in the manner of a hexagonal nut. Although six flats 46 are provided on the outer surface of the driver 42, a greater or fewer number of flats 46 can be provided, as required by the application. In some embodiments, one or both of the opposed ends 48, 49 of the driver 42 may have rounded or chamfered edges to facilitate insertion of the driver 42 into the receiver 50.

The receiver 50 is an assembly that includes a connector 60, a torque transfer device 80 and an output device 100. The connector 60 is rigid, generally block-shaped structure that is configured to engage with the collar 14 in such a way that the receiver 50 is detachably connected to the tool 1. The connector 60 includes a through hole 63 that extends between a first, tool-facing end 61 of the connector 60 and a second end 62 of the connector 60, where the second end 62 is opposed to the first end 61. When the connector 60 is secured to the tool 1, the through hole 63 is concentric with the rotational axis 26 of the motor output shaft 24. The through hole 63 has a non-uniform diameter. In particular, a first portion 64 of the through hole 63 opens at the connector first end 61 and has a first diameter d1, and a second portion 65 of the through hole 63 opens at the connector second end 62 and has a second diameter d2. The second diameter d2 is less than the first diameter d1, whereby a first shoulder 66 is disposed at the transition between the through hole first portion 64 and the through hole second portion 65.

The through hole first portion 64 is shaped and dimensioned to receive the collar 14 in a clearance fit. Since the collar 14 has a cylindrical shape, the through hole first portion 64 has a corresponding cylindrical shape. A pair of protrusions 68 are located on the through hole first portion 64 at a location disposed between the first shoulder 66 and the connector first end 61. The protrusions 68 are diametrically opposed to each other. In the illustrated embodiment, each protrusion 68 is a low profile, rounded bump that is received in a corresponding groove 34 of the collar 14, and the protrusions 68 cooperate with the grooves 34 to retain the connector 60 on the collar 14. In some embodiments, the connector 60 is fixedly engaged with the collar 14 upon an approximate ¼ turn rotation of the connector 60 relative to the collar 14, and can be disengaged by an approximate ¼ turn rotation of the connector 60 relative to the collar 14 in an opposed direction. By this configuration, the connector 60, and thus also the receiver 50, can be quickly and easily connected to, and detached from, the collar 14.

The through hole second portion 65 is shaped and dimensioned to receive the torque transfer device 80. As discussed below, the torque transfer device 80 has a flange 89 that extends about a circumference of the torque transfer device 80, and the through hole second portion 65 includes a cut out 69 that is shaped and dimensioned to accommodate the flange 89. The cut out 69 opens to the connector second end 62. A second shoulder 67 is disposed at the transition between the through hole second portion 65 and the cut out 69.

The connector 60 includes a through slot 70 that extends in a direction perpendicular to the rotational axis 26 and opens at each of the opposed lateral sides 71, 72 of the connector 60. The through slot 70 has a rectangular cross-sectional shape to accommodate and conform to the cross-sectional shape of an arm 101 of the output device 100. The through slot 70 intersects with the cut out 69 while being spaced apart from the connector second end 62 and the second shoulder 67.

The torque transfer device 80 is disposed in the through hole second portion 65. The torque transfer device 80 is configured to receive the driver 42, and transmit the rotational motion of the output shaft 24 to the output device 100, as discussed further below. The torque transfer device 80 is generally cup shaped, and includes a base 81 and a sidewall 84 that protrudes from a first side 82 of the base 81 toward the housing 2. The sidewall 84 includes an internal geometry that allows the driver 42 to transfer torque from the output shaft 24 to the output device 100. In particular, inner surface 85 of the sidewall 84 includes a geometric feature that corresponds to the geometric feature provided on the driver 42. In the illustrated embodiment, the geometric feature corresponds to six flats 86 that are distributed along an inner circumference of the sidewall 84, each flat 86 sharing a common edge with the adjoining flats 86. In use the driver 42 is received within the torque transfer device 80, and the flats 86 provided on the sidewall inner surface 85 confront and engage with a corresponding flat 46 provided on the driver outer surface 45 in such a way that rotation of the driver 42 results in rotation the torque transfer device 80 relative to the connector 60.

The torque transfer device 80 has the flange 89 that extends about a circumference of the torque transfer device 80 so as to surround the base 81 and protrude in a direction perpendicular to the rotational axis 26. The flange 89 has a diameter d3 that is greater than the diameter d2 of the second portion 65 but less than the diameter d4 of the cut out 69. The flange 89 confronts and abuts the second shoulder 67, and thus serves as a stop that limits the extent to which the torque transfer device 80 can move axially toward the connector first end 61.

The torque transfer device 80 includes a drive shaft 90 that protrudes from a second side 83 of the base 81 away from the housing 2, where the second side 83 of the base 81 is opposed to the first side 82 of the base 81. The drive shaft 90 is connected to the output device 100 in such a way that rotation of the torque transfer device 80 results in a translation of the output device 100 within the through slot 70, as discussed further below. In some embodiments, the drive shaft 90 is formed integrally with the base 81. In the illustrated embodiment, the drive shaft 90 is a pin that is press fit within an opening 88 in the base 81. The drive shaft 90 extends in parallel to the axis of rotation 26, and is received within a slot 107 provided in the arm 101 of the output device 100, as discussed further below.

The output device 100 is an elongated arm 101 that is disposed in the through slot 70 of the connector 60. The arm 101 is a narrow, thin plate that is elongated in a direction perpendicular to the rotational axis 26, and includes a first end 102 that protrudes from the through slot 70 at the connector first lateral side 71 and a second end 103 that protrudes from the through slot 70 at the connector second lateral side 72. The arm 101 includes a longitudinal axis 104 that extends between the arm first end 102 and the arm second end 103. The arm 101 extends through the cut out 69, and the base 81 of the torque transfer device 80 is disposed between the arm 101 and the second shoulder 67 of the connector 60. Thus, the arm 101 retains the torque transfer device 80 within the through hole 63 of the connector 60.

In addition, the arm 101 includes the slot 107 that extends between a housing-facing surface 105 of the arm 101 and a workpiece-facing surface 106 of the arm 101. The slot 107 is elongated in a direction that is perpendicular to both the rotational axis 26 and the arm longitudinal axis 104. The slot 107 is dimensioned to receive the drive shaft 90 of the torque transfer device 80. The slot 107 is located in a mid region of the arm 101, at a location spaced apart from the arm first and second ends 102, 103.

The arm 101 is supported by the connector 60 in such a way that the arm 101 can translate relative to the connector 60 in a direction that is perpendicular to both the axis of rotation 26 and the direction of elongation of the slot 107 (e.g.). In particular, the output device 100 is disposed in the through slot 70, and is driven by the drive shaft 90 of the torque transfer device 80 to translate in a reciprocating motion relative to the connector 60. The reciprocating motion occurs in a direction that is parallel to the arm longitudinal axis 104.

In addition to the slot 107, the arm 101 also includes a through hole 108 disposed between the slot 107 and the arm second end 103. In the illustrated embodiment, the through hole 108 is disposed adjacent to the arm second end 103 so that it resides outside the connector 60 regardless of the position of the arm 101. The through hole 108 is used to connect the accessory 200 to the adaptor 40. For example, in some embodiments, a shank 202 of the accessory 200 is received in the through hole 108 (FIG. 2), whereby the accessory 200 reciprocates in concert with the arm 101 during operation of the tool 1.

In use, the connector 60 engages the collar 14 by insertion of the protrusions 68 into the retaining grooves 34. At the same time, the driver 42 is inserted into the torque transfer device 80 in such a way that the flats 86 provided on the sidewall inner surface 85 confront and engage with a corresponding flat 46 provided on the driver outer surface 45. In this configuration, the connector 60 is secured to the tool housing 2, and rotation of the driver 42 results in rotation the torque transfer device 80 relative to the connector 60. As the torque transfer device 80 rotates, the drive shaft 90 drives the arm 101 of the output device 100 to reciprocate in the through slot 70 in the manner of a scotch yoke. Thus, the accessory 200 attached to the adaptor 40 is driven by the tool 1 to reciprocate.

In the embodiment illustrated in FIG. 2, the accessory 200 is a brush 204. It is understood that the accessory 200 is not limited to being a brush 204, and could alternatively be a scrubbing pad, buffing pad or other cleaning implement. In still other embodiments, the accessory may be a cutting blade or sanding head.

Referring to FIGS. 8-11, the rotary cleaning tool 1 may include an alternative embodiment adaptor 240 that includes the driver 42 and an alternative embodiment receiver 250. The receiver 250 is configured to receive the driver 42 and transmit the rotational motion of the output shaft 24 to the accessory 200. In the illustrated embodiment, the receiver 250 is configured to provide a rotational output to the accessory 200 at a reduced speed and increased torque relative to that of the output shaft 24, as discussed in detail below.

The receiver 250 is an assembly that includes a connector 260, a torque transfer device 280 and an output device 300. The connector 260 is rigid, generally cylindrical structure that is configured to engage with the collar 14 in such a way that the receiver 250 is detachably connected to the tool 1.

The connector 260 is an assembly of a container 272 and a cover 261 that is fixed to, and closes, an open end 273 of the container 272. The container 272 receives and supports the output device 300, as discussed in detail below. The cover 261 is disposed between the container 272 and the tool 1, and surrounds the torque transfer device 280. The cover 261 includes a cover plate 264 that is secured to the container 272, and hollow sleeve 262 that protrudes from a tool-facing surface 269 of the cover plate 264 towards the tool 1. The cover plate 264 includes a cover plate central opening 265, and the sleeve 262 is concentric with the cover plate central opening 265. The cover plate 264 includes a pair of diametrically opposed fastener openings 266 that are configured to receive fasteners (not shown) that secure the cover plate 264 to the container open end 273. The fastener openings 266 are disposed between the cover plate central opening 265 and a peripheral edge 267 of the cover plate 264. The sleeve 262 has an inner diameter d5 that is greater than the diameter d6 of the cover plate central opening 265. The fastener openings 266 reside outside the sleeve 262.

The sleeve 262 is shaped and dimensioned to receive the collar 14 in a clearance fit. Since the collar 14 has a cylindrical shape, the sleeve 262 has a corresponding cylindrical shape. A pair of protrusions 268 are located on an inner surface of the sleeve 262 at a location disposed between opposed ends 270, 271 of the sleeve 262. The protrusions 268 are diametrically opposed to each other. In the illustrated embodiment, each protrusion 268 is a low profile, rounded bump that is received in a corresponding groove 34 of the collar 14, and the protrusions 268 cooperate with the grooves 34 to retain the connector 60 on the collar 14. In some embodiments, the connector 260 is fixedly engaged with the collar 14 upon an approximate ¼ turn rotation of the connector 260 relative to the collar 14, and can be disengaged by an approximate ¼ turn rotation of the connector 260 relative to the collar 14 in an opposed direction. By this configuration, the connector 260, and thus also the receiver 250, can be quickly and easily connected to, and detached from, the collar 14.

Figure 9:
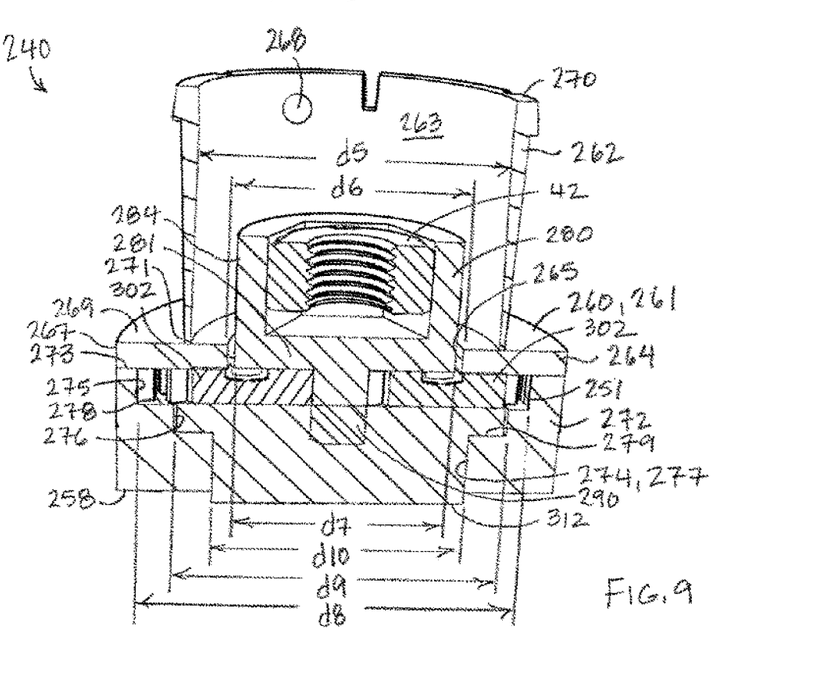
FIG. 9 is a cross sectional view of the alternative embodiment adaptor as seen along line 9-9 of FIG. 8.
Figure 10:
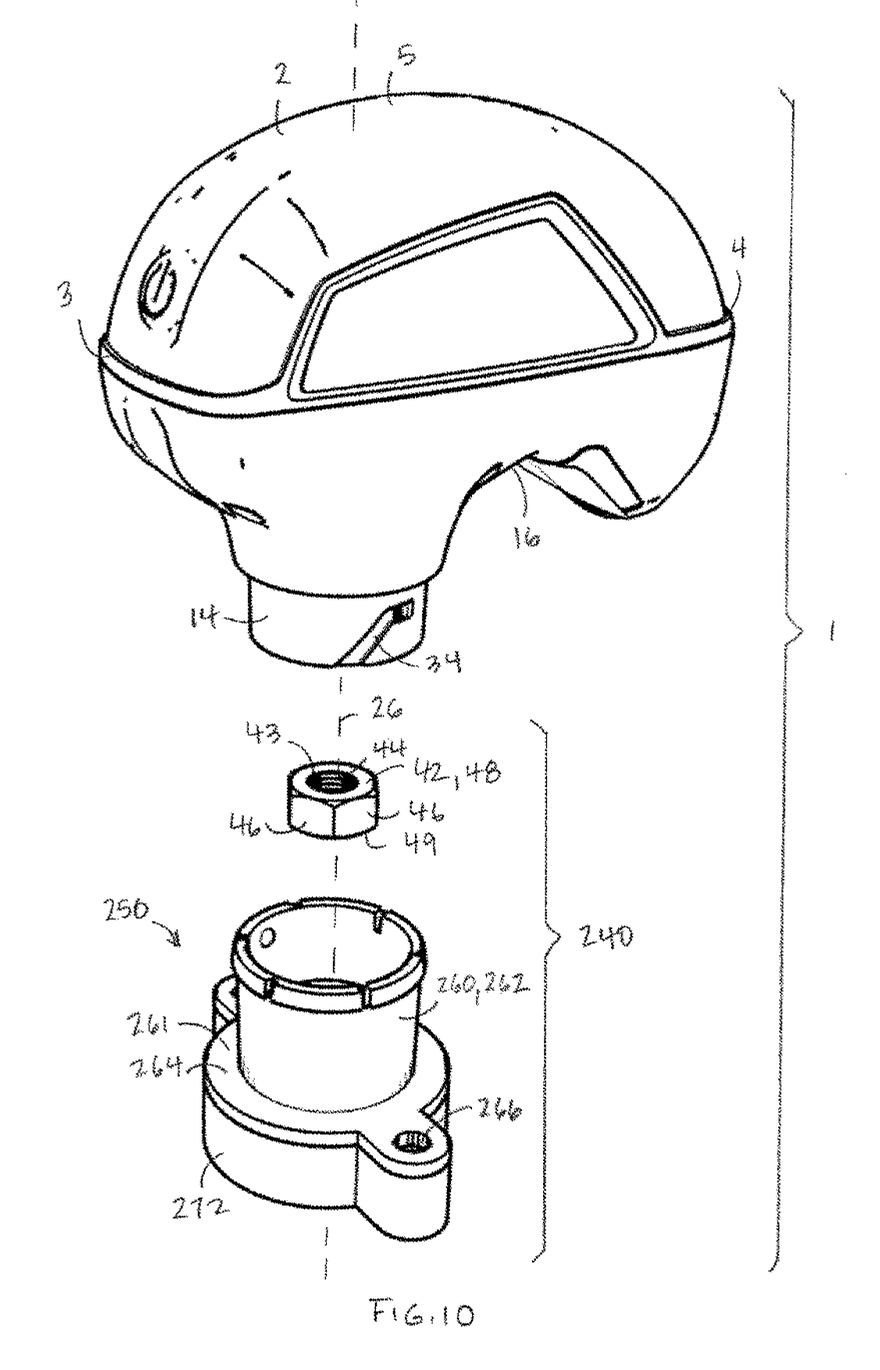
FIG. 10 is an exploded top perspective view of the handheld rotary power tool of FIG. 8.
Figure 11:
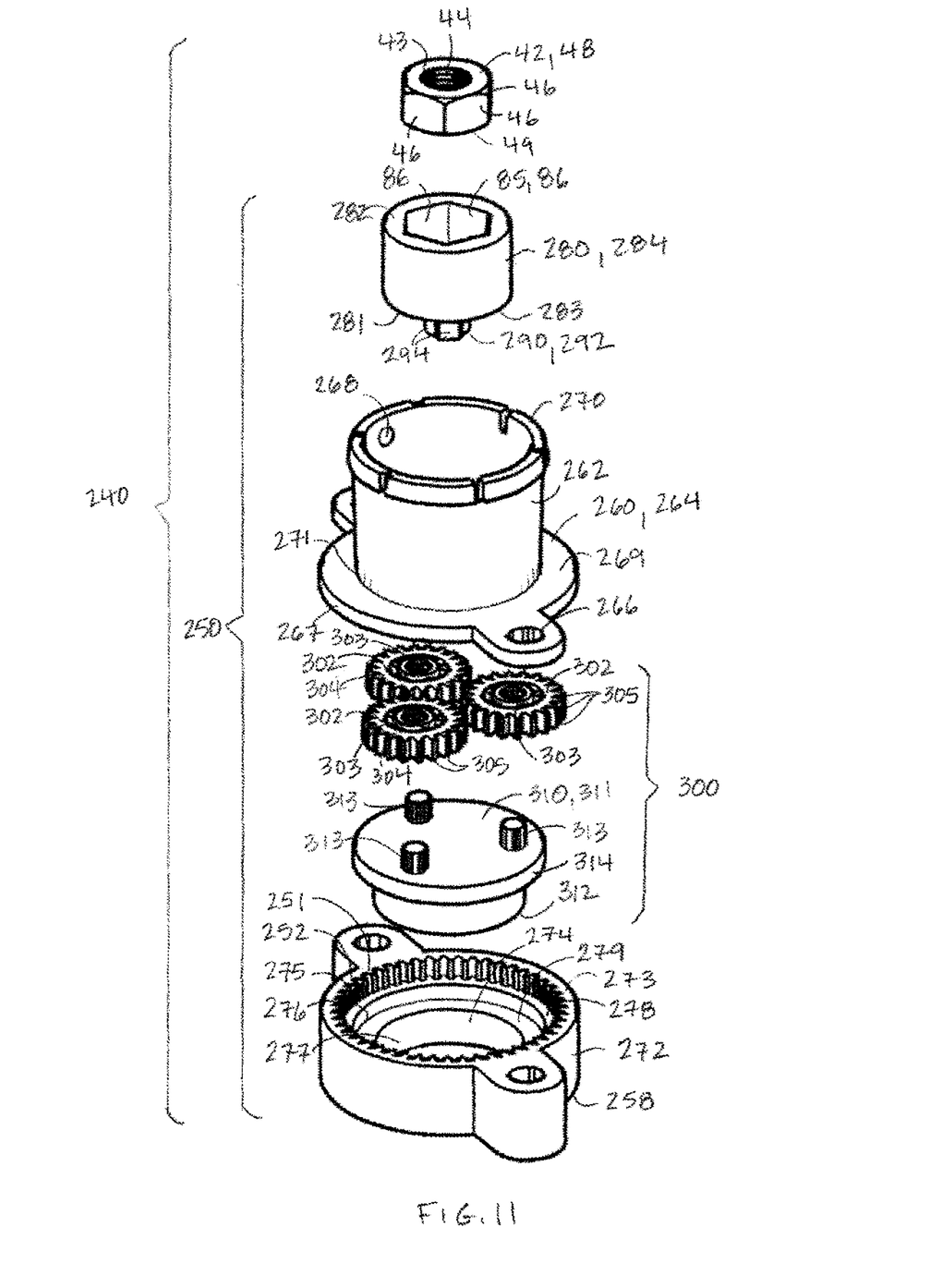
FIG. 11 is an exploded top perspective view of the adaptor of FIG. 9.

The sleeve inner diameter d5 is greater than an outer diameter d7 of the torque transfer device 280. The torque transfer device 280 is disposed in the sleeve 262 in such a way as to reside in the cover plate central opening 265, whereby the sleeve 262 surrounds, and is spaced apart from, the torque transfer device 280.

The container 272 is a disk shaped structure having a container central opening 274. The container central opening 274 is shaped and dimensioned to receive and support the torque transfer device 280 and the output device 300. The container central opening 274 has a non-uniform diameter. In particular, a first portion 275 of the container central opening 274 opens at the container open end 273 and has a first container diameter d8. A second portion 276 of the container central opening 274 has a second container diameter d9 that is less than the first container diameter d8. A third portion 277 of the container central opening 274 opens at an end 258 of the container 272 that is opposed to the container open end 273 and has a third container diameter d10 that is less than the second container diameter d9. A first shoulder 278 is disposed at the transition between the first and second portions 275, 276 of the container central opening 274, and a second shoulder 279 is disposed at the transition between the second and third portions 276, 277 of the container central opening 274.

The container central opening 274 communicates with, and is concentric with, the cover plate central opening 265. Together, the cover plate central opening 265 and the container central opening 274 provide a connecter through hole 263 that, when the connector 260 is secured to the tool 1, is concentric with the rotational axis 26 of the motor output shaft 24.

An internal ring gear 251 is provided on the first portion 275 of the container central opening 274. The teeth of the internal ring gear 251 are shaped and dimensioned to engage with the external teeth of the planetary gears 302 of the output device 300, and portions of the periphery of the planetary gears 302 are supported on the first shoulder 278 of the container 272, as discussed in detail below.

As discussed below, a carrier portion 310 of the output device 300 has a carrier flange 314 that extends about a circumference of the carrier portion. The carrier flange 314 is supported on the second shoulder 279 of the container 272.

The torque transfer device 280 is configured to receive the driver 42, and transmit the rotational motion of the output shaft 24 to the output device 300, as discussed further below. The torque transfer device 280 is generally cup shaped, and includes a base 281 and a sidewall 284 that protrudes from a first side 282 of the base 281 toward the housing 2. The sidewall 284 includes an internal geometry that allows the driver 42 to transfer torque from the output shaft 24 to the output device 300. In particular, the inner surface 285 of the sidewall 284 includes a geometric feature that corresponds to the geometric feature provided on the driver 42. In the illustrated embodiment, the geometric feature corresponds to six flats 286 that are distributed along an inner circumference of the sidewall 284, each flat 286 sharing a common edge with the adjoining flats 286. In use, the driver 42 is received within the torque transfer device 280, and the flats 286 provided on the sidewall inner surface 285 confront and engage with a corresponding flat 46 provided on the driver outer surface 45 in such a way that rotation of the driver 42 results in rotation the torque transfer device 280 relative to the connector 260.

The torque transfer device 80 includes a drive shaft 290 that protrudes from a second side 283 of the base 281 away from the housing 2, where the second side 283 of the base 281 is opposed to the first side 282 of the base 281. The drive shaft 290 is connected to the output device 300 in such a way that rotation of the torque transfer device 280 results in a rotation of the carrier portion 310 relative to the container 272 as discussed further below. In the illustrated embodiment, the drive shaft 290 is formed integrally with the base 281. In other embodiments, the drive shaft 290 may be formed separately from the base 281 and fixed thereto, for example via welding. In the illustrated embodiment, the drive shaft 290 is a pinion gear 292 that extends in parallel to the axis of rotation 26. The torque transfer device 280 is disposed in the connector through hole 263 and supported on the tool-facing surfaces of the planetary gears 302 in such a way that the sidewall 284 is surrounded by the sleeve 262 and the drive shaft 290 protrudes into the first portion of the container central opening 274. The external teeth 294 of the drive shaft 290 are configured to engage with the external teeth 305 of the planetary gears 302, as discussed further below.

The output device 300 is disposed in the container central opening 274. The output device 300 includes the planetary gears 302 and the carrier portion 310 that supports the planetary gears 302 for rotation within the container 272. The carrier portion 310 has a disk shape and includes a first, tool-facing surface 311, and a second surface 312 that is opposed to the first surface 311 and faces away from the tool 1. The carrier portion 310 includes the radially extending carrier flange 314 that is disposed at the carrier portion first surface 311. The carrier flange 314 is disposed in the second portion 276 of the container central opening 274 and is supported on the second shoulder 279. In particular, the second shoulder 279 provides a bearing surface on which the carrier portion 310 rotates, as discussed below. The carrier portion 310 extends through the third portion 277 of the container central opening 274 such that the second surface 312 is disposed outside the container 272.

The carrier portion 310 includes axles 313 in the form of rigid pins that protrude from the first surface 311 toward the tool 1. Each axle 313 extends through a central opening 306 of a corresponding planetary gear 302, and serves as the axis of rotation for the corresponding planetary gear 302.

In the illustrated embodiment, the carrier portion 310 includes three axles 313, and the output device 300 includes three planetary gears 302. The planetary gears 302 are disposed in the first portion 275 of the container central opening 274 so as to be engaged with both the drive shaft 290 and the internal ring gear 251. The planetary gears 302 are driven for rotation by the drive shaft 290. In particular, each planetary gear 302 rotates about a corresponding axle 313. As a result of this rotation, the planetary gears travel along an inner circumference of the internal ring gear 251 via engagement of the external teeth 305 of the planetary gears 302 with the internal teeth 252 of the internal ring gear 251.

In use, the sleeve 262 engages the collar 14 by insertion of the protrusions 268 into the retaining grooves 34. At the same time, the driver 42 is inserted into the torque transfer device 280 in such a way that the flats 286 provided on the sidewall inner surface 285 confront and engage with a corresponding flat 46 provided on the driver outer surface 45. In this configuration, the connector 260 is secured to the tool housing 2, and rotation of the driver 42 results in rotation the torque transfer device 280 relative to the connector 260. As the torque transfer device 280 rotates, the drive shaft 290 drives the planetary gears 302 to rotate, which in turn results in rotation of the carrier portion 310 relative to the connector 260. The drive shaft 290, the planetary gears 302 and the internal ring gear 251 are configured to transmit rotation to the carrier portion 310 at a reduced speed and increased torque relative to that of the output shaft 24. Thus, an accessory attached to the adaptor 40 is driven by the tool 1 to rotate.

The second surface 312 of the carrier portion 310 serves as an accessory attachment surface. In particular, an accessory may be attached to the carrier portion second surface 312 in such a way as to rotate in concert with the carrier portion 310. For example, in some embodiments, the accessory is, for example, a scrubbing pad (not shown) that is attached to the carrier portion second surface 312 via an adhesive. In other embodiments, the accessory may be attached to the carrier portion second surface 312 via hook and loop fastener. In still other embodiments, the accessory may be attached to the carrier portion second surface via a threaded connection or via fasteners.

Although the rotary cleaning tool 1 described above includes a rechargeable battery 18, the tool 1 is not limited to this type of power supply. For example, in some embodiments, the battery 18 is not rechargeable. In other embodiments, the battery 18 is omitted, and the motor 20 is powered by a wired connection to a utility power line.

Although the illustrated embodiments depict the hand-held rotary power tool 1 as being a rotary cleaning tool, it is understood that the hand-held rotary power tool is not limited to cleaning tools, and can be used for alternative rotary tool applications including cutting, sanding, etc.

Selective illustrative embodiments of the rotary cleaning tool and splash guard are described above in some detail. It should be understood that only structures considered necessary for clarifying the rotary cleaning tool and splash guard have been described herein. Other conventional structures, and those of ancillary and auxiliary components of the rotary cleaning tool and splash guard, are assumed to be known and understood by those skilled in the art. Moreover, while a working example of the rotary cleaning tool and splash guard have been described above, the rotary cleaning tool and splash guard are not limited to the working examples described above, but various design alterations may be carried out without departing from the rotary cleaning tool and splash guard as set forth in the claims.

We claim:

1. A rotary power tool assembly including a hand-held rotary power tool and an adaptor that is connected to the tool and configured to connect an accessory to the tool,
    the tool comprising:
        a housing that includes a collar disposed at one end of the housing, the collar being fixed relative to the housing; and
        a motor disposed inside the housing, the motor including an output shaft that extends through an opening in the collar so as to protrude from the housing, the output shaft being rotatable relative to the collar,
    the adaptor comprising
        a driver that is connected to the output shaft in such a way as to rotate in concert with the output shaft, an outer surface of the driver having a first geometric feature; and
        a receiver that includes a connector, a torque transfer device and an output device, wherein
            the connector comprises a through opening that is concentric with an axis of rotation of the output shaft, and the connector is configured to engage with the collar in such a way that the receiver is detachably connected to the housing,
            the torque transfer device is configured to receive the driver, an inner surface of the torque transfer device including a second geometric feature that is configured to engage with the first geometric feature in such a way that rotation of the driver results in rotation the torque transfer device relative to the connector, and the torque transfer device comprises:
                a cup portion including a base and a sidewall that protrudes from a first side of the base toward the housing, an inner surface of the sidewall comprising the second geometric feature, and
                a drive shaft that protrudes from a second side of the base, the second side of the base being opposed to the first side of the base, the drive shaft being connected to the output device in such a way that rotation of the torque transfer device results in movement of the output device, and
            the output device is supported by the connector and is driven by the torque transfer device to move relative to the connector.

2. The assembly of claim 1, wherein an outer surface of the output shaft includes a first helical thread, and the driver includes an inner surface, the driver inner surface including a second helical thread that is shaped and dimensioned to engage with the first helical thread in such a way that the output shaft and the driver are connected.

3. The assembly of claim 1, wherein the first geometric feature includes a flat provided on the driver outer surface and the second geometric feature includes a corresponding flat provided on the torque transfer device inner surface.

4. The assembly of claim 3, wherein the first geometric feature and the second geometric feature each comprise a plurality of flats arranged in a hexagonal configuration, and each flat of the first geometric feature confronts a corresponding flat of the second geometric feature.

5. The assembly of claim 1, wherein the torque transfer device is disposed in the through opening of the connector, and is supported relative to the connector by the output device.

6. The assembly of claim 1, wherein
the drive shaft is a pin, and
the output device comprises an arm that is supported by the connector for translation relative to the connector, the arm including a slot that receives the pin, whereby rotation of the drive shaft results in translation of the arm relative to the connector.

7. The assembly of claim 6, wherein
the pin extends in parallel to the axis of rotation,
the slot is elongated in a direction perpendicular to the axis of rotation,
the arm is supported by the connector in such a way that the arm can translate relative to the connector in a direction that is perpendicular to both the axis of rotation and the direction of elongation of the slot, and
the pin is engaged with the slot in such a way that rotation of the drive shaft results in oscillation of the arm.

8. The assembly of claim 7, comprising the accessory connected to the arm.

9. The assembly of claim 8, wherein the accessory is a brush.

10. The assembly of claim 1, wherein
the drive shaft is a pinion gear,
the connector includes an internal ring gear disposed on an inner surface thereof, and
the output device includes
planetary gears engaged with both the drive shaft and the internal ring gear, the planetary gears driven for rotation by the drive shaft, and
a carrier that supports the planetary gears and provides an axle for each of the planetary gears, whereby rotation of the drive shaft results in rotation of each planetary gear about the corresponding axle and rotation of the carrier relative to the connector.

11. The assembly of claim 10, wherein the torque transfer device is disposed in the through opening of the connector, and is supported relative to the connector by the output device.

12. The assembly of claim 10, comprising the accessory connected to the carrier.

13. The assembly of claim 12, wherein the accessory is brush.

14. The assembly of claim 1, wherein the collar is configured to fixedly engage with the connector via a quick-disconnect connection device.

15. The assembly of claim 1, wherein
the connector includes a first quarter turn connecting structure,
the collar includes a second quarter turn connecting structure, and
the collar is configured to fixedly engage with the connector via engagement of the first quarter turn connecting structure with the second quarter turn connecting structure.

16. An adaptor configured to connect an accessory to a motorized hand tool having a housing and a rotatable output shaft that protrudes from the housing,
the adaptor comprising
a driver that is connected to the output shaft in such a way as to rotate in concert with the output shaft, an outer surface of the driver having a first geometric feature; and
a receiver that includes a connector, a torque transfer device and an output device, wherein
the connector is configured to engage with the collar in such a way that the receiver is detachably connected to the housing, the connector comprising a through opening that is concentric with an axis of rotation of the output shaft,
the torque transfer device is configured to receive the driver, an inner surface of the torque transfer device including a second geometric feature that is configured to engage with the first geometric feature in such a way that rotation of the driver results in rotation the torque transfer device relative to the connector, and the torque transfer device comprises:
a cup portion including a base and a sidewall that protrudes from a first side of the base toward the housing, an inner surface of the sidewall comprising the second geometric feature, and
a drive shaft that protrudes from a second side of the base, the second side of the base being opposed to the first side of the base, the drive shaft being connected to the output device in such a way that rotation of the torque transfer device results in movement of the output device, and
the output device is supported by the connector and is driven by the torque transfer device to move relative to the connector.

17. The adaptor of claim 16, wherein
the drive shaft is a pin, and
the output device comprises an arm that is supported by the connector for translation relative to the connector, the arm including a slot that receives the pin, whereby rotation of the drive shaft results in translation of the arm relative to the connector.

18. The adaptor of claim 16, wherein
the drive shaft is a pinion gear,
the connector includes an internal ring gear disposed on an inner surface thereof, and
the output device includes
planetary gears engaged with both the drive shaft and the internal ring gear, the planetary gears driven for rotation by the drive shaft, and
a carrier that supports the planetary gears and provides an axle for each of the planetary gears, whereby rotation of the drive shaft results in rotation of each planetary gear about the corresponding axle and rotation of the carrier relative to the connector.

* * * * *